Figure 1:
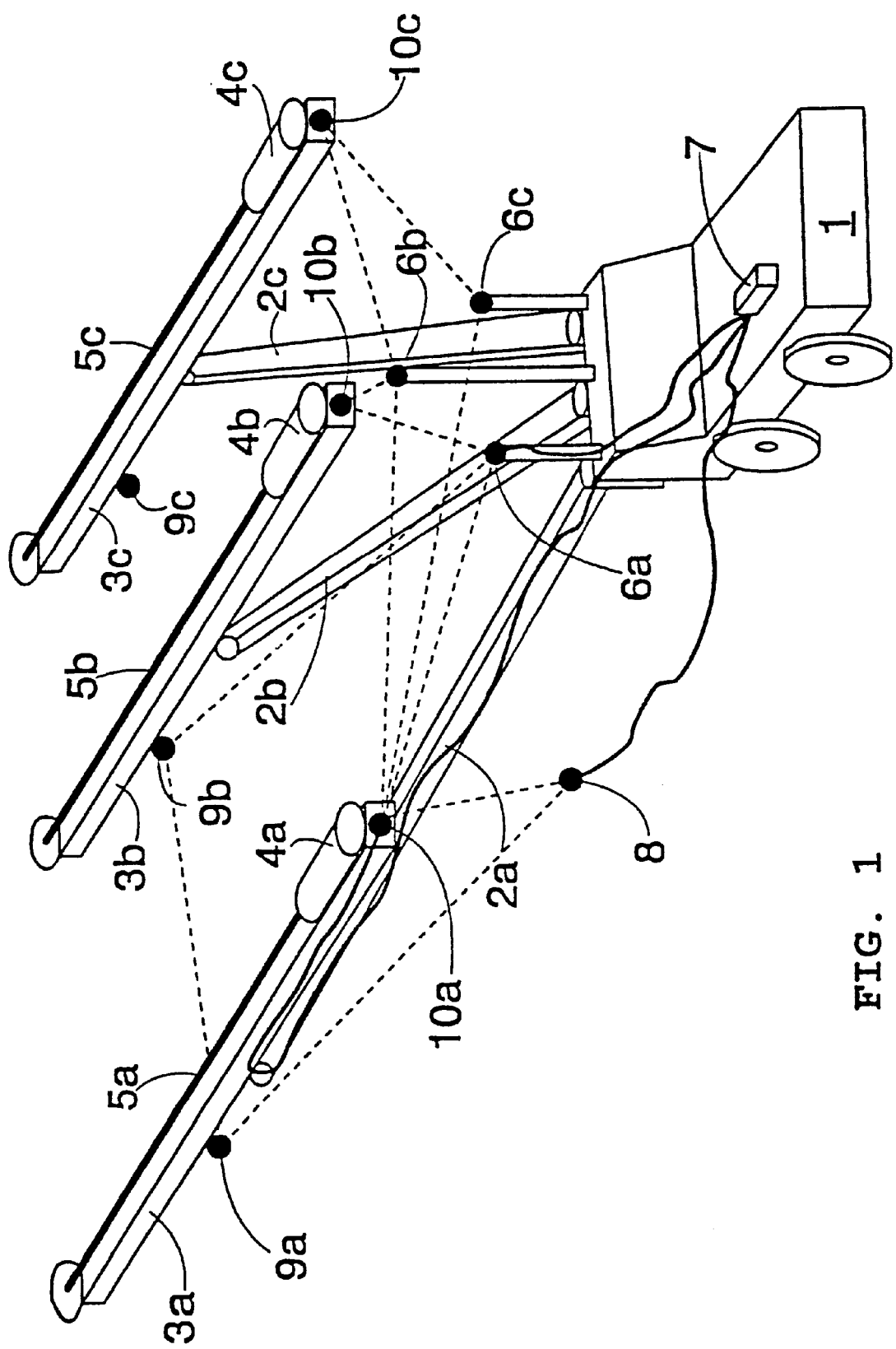

United States Patent
Tuunanen

[11] Patent Number: 5,934,387
[45] Date of Patent: Aug. 10, 1999

[54] METHOD FOR DETERMINING THE POSITION OF A TOOL OF A ROCK DRILL

[75] Inventor: Ari Tuunanen, Tampere, Finland

[73] Assignee: Tamrock Oy, Finland

[21] Appl. No.: 08/875,171

[22] PCT Filed: Jan. 19, 1996

[86] PCT No.: PCT/FI96/00041

§ 371 Date: Jul. 18, 1997

§ 102(e) Date: Jul. 18, 1997

[87] PCT Pub. No.: WO96/22547

PCT Pub. Date: Jul. 25, 1996

[30] Foreign Application Priority Data

Jan. 20, 1995 [FI] Finland .................................. 950251

[51] Int. Cl.[6] .................................................. E21B 47/02
[52] U.S. Cl. .............................................. 175/45; 175/162
[58] Field of Search ................................ 175/45, 40, 162; 173/20, 21, 2

[56] References Cited

U.S. PATENT DOCUMENTS

| | | | |
|---|---|---|---|
| 3,712,391 | 1/1973 | Coyne | 175/26 |
| 3,876,016 | 4/1975 | Stinson | 175/45 |
| 4,113,033 | 9/1978 | Lindblad | 173/1 |
| 4,238,828 | 12/1980 | Hay et al. | 175/45 |
| 4,267,892 | 5/1981 | Mayer | 173/43 |
| 5,680,906 | 10/1997 | Andrieux et al. | 175/45 |

FOREIGN PATENT DOCUMENTS

| | | |
|---|---|---|
| 1332968 | 11/1994 | Canada . |
| 3406212 A1 | 8/1985 | Germany . |
| 8704190 | 9/1989 | Sweden . |
| 2 180 117 | 3/1987 | United Kingdom . |
| WO 95/19576 | 7/1995 | WIPO . |

*Primary Examiner*—Hoang C. Dang
*Attorney, Agent, or Firm*—Nixon & Vanderhye

[57] ABSTRACT

A method for determining the position of a feed beam (3a to 3c) of a rock drilling equipment so that first, the position of a base (1) of the rock drilling equipment relative to rock is determined in the general system of coordination and after that, the position of the feed beam (3a to 3c) relative to the base (1) is measured. Measuring devices (6a to 6c) fixedly mounted in the base (1) at a distance from one another and at least two measuring devices (9a to 9c, 10a to 10c) attached to the feed beam at a distance from one another at a predetermined position are used in the method, whereby at least some of the measuring devices comprise a transmitter and at least some a receiver, respectively. The position of the feed beam (3a to 3c) relative to the base is measured, for example, by using the propagation time of the oscillation energy transmitted by each transmitter to various receivers and by calculating on the basis of this the position of the measuring devices (9a to 9c, 10a to 10c) of the feed beam relative to the measuring devices (6a to 6c) mounted in the base (1) and based on this, by calculating the position of the feed beam relative to the base (1) and thus relative to the general coordination of the rock.

8 Claims, 1 Drawing Sheet

METHOD FOR DETERMINING THE POSITION OF A TOOL OF A ROCK DRILL

BACKGROUND AND SUMMARY OF THE INVENTION

The invention relates to a method for determining the position of a tool of a rock drill in a known system of coordination relative to rock when using a rock drilling equipment comprising a base, at least one drilling boom mounted pivotally relative to the base and a rock drill connected pivotally relative to the boom to the other end of the boom and provided with a tool, in which method the position of the base of the rock drilling equipment in said system of coordination is determined and the position of the tool in said system of coordination is determined on the basis of the position of the base.

In excavating underground spaces, the accuracy of excavation is highly significant—the space to be excavated, e.g. a traffic tunnel, has been set a nominal measure which must not be reduced. When using the drilling/explosion method, drilling accuracy has a significant effect on the accuracy of excavation. In order to improve the drilling accuracy of holes, the positions of planned holes can be measured in advance with separate measuring devices and marked on the rock surface. Another method is to use instrumented or automatic drilling equipments in which the drilling boom is provided with sensors measuring the position of its joints; on the basis of the sensors the position and direction of the rock drill and thus of its tool relative to the base of the equipment can be determined—when this information is connected to a separately determined position and direction of the base of the equipment, the position and direction of the drill relative to the planned drill pattern can be determined and thus controlled. Regardless of the use of different methods, drilling accuracy has in practice been variable. This is because the methods require either handiwork or skill or that the measuring of the position of the joints of the drilling boom are sensitive to e.g. variation in the mechanical characteristics of the parts of the boom caused by wear and exterior forces acting on the boom. The variation in drilling accuracy leads, for example, to that in practice, more rock has to be excavated as a precaution than was planned. This causes additional costs in drilling, in explosion, in handling the blasted rock and in supporting the space. The variation in drilling accuracy is also harmful when excavating ores in which case the excavation of extra rock only incurs costs. Also, the precise direction and positioning of a tool is difficult in other rock drilling activity, such as when extracting off rock blocks with a percussion hammer by means of a striking tool or when doing any essential work with varying rock drilling equipments.

Finnish Patent Application 884,970 discloses an arrangement in which a feed beam of a rock drilling equipment is directed by using at least three laser beams the direction and position of which relative to the general system of coordination is known and by placing transmitters/receivers at each beam and at the feed beam at a distance from one another so that the direction and position of the feed beam in the general system of coordination of the tunnel can be measured on the basis of the oscilllation waves from the transmitters. This arrangement is suitable for long hole drilling but it is difficult to apply to tunnel drilling because laser beams have to be detached from their positions for the duration of explosion so that they would not be damaged. Further, if drilling equipments comprising more than one feed beam are used, not even three laser beams are necessarily enough so that the direction and position of all feed beams could be measured by means of them.

British Patent Application 2 180 117 discloses a method in which the position of the measuring tip is determined by using three measuring units mounted at fixed positions in the surroundings and two detectors mounted to the shaft of the measuring tip, whereby each measuring unit measures the position and distance of the detector and on the basis of this the position of the measuring tip is calculated. This arrangement requires that the measuring units are fixedly mounted in the surroundings, wherefore this method cannot be applied as such to rock drilling, nor can the arrangement disclosed in said Finnish Patent Application.

The object of this invention is to achieve such a method for measuring the position of a tool of a rock drill of a rock drilling equipment that can be used effectively and easily in all drilling and also when using more rock drilling equipments, if required.

The method of the invention is characterized in that the position of the tool relative to the base is determined by measuring, using at least three measuring devices situated at a known position relative to the base and at a distance from one another, wherein at least two are attached to the base, and at least one measuring device is located at a known position relative to the tool. At least some of the measuring devices comprise a transmitter for transmitting oscilllation energy and correspondingly, at least some of the measuring devices comprise a receiver for receiving oscilllation energy. The distance between the transmitters and receivers is measured on the basis of the oscilllation energy transmitted by each transmitter; the distances between the receivers and transmitters are calculated on the basis of the measured distances; and the position of the tool relative to the base is determined on the basis of the distances calculated.

The essential idea of the invention is that at least two measuring devices, that is, transmitters or receivers, mounted in the base of the rock drilling equipment are used and similarly, receivers or transmitters arranged at a known position relative to each rock drill or, when desired, in both cases transmitter-receivers, whereby the position of the rock drills and their tools can always be determined relative to the base. A further essential idea of the invention is that the position of the base of the rock drilling equipment relative to the rock in the general system of coordination is determined in some manner known per se, such as by means of laser or fixed point navigation, whereby when determining the position of the rock drill relative to the base, they are at the same time determined relative to the general system of coordination. According to one preferred embodiment of the invention, a separate transmitter-receiver unit, for example, can be used to help in determining the position of the rock drills. The transmitter-receiver unit is placed at a suitable position in the vicinity of the rock to be drilled, such as below rock drills or booms after which the position of this separate transmitter-receiver unit is determined by means of measuring devices fixedly mounted in the base after which the separate unit can be used for measuring the position of the rock drills.

A logical and readily useable measurement is achieved with the method according to the invention at the same time as a reliable measurement is obtained in all conditions by using several different measuring devices.

The invention will be explained in more detail in the accompanying drawing which illustrates schematically the application of the equipment of the invention in connection with a rock drilling equipment provided with three booms and three feed beams. In this patent application and in the claims, a rock drilling equipment refers not only to an ordinary rock drilling equipment provided with a drill rod, but also to percussion hammers provided with a striking tool or other such rock drilling equipments intended for rock breakage or for making a hole.

In the FIGURE there is a base 1 of a rock drilling equipment to which are connected pivotally in a manner known per se three booms 2a to 2c and to the ends of the booms 2a to 2c feed beams 3a to 3c, respectively. A rock drill 4a to 4c moves on each feed beam in its longitudinal direction in a manner known per se and in the FIGURE a tool 5a to 5c is connected to each rock drill which in the case shown in the FIGURE is a drill rod with which a hole is drilled. The joints between the booms 2a to 2c and feed beams 3a to 3c and the base 1, respectively and the rotating of the booms and the feed beams relative to the joints are generally well known per se, wherefore they will not be explained any further herein.

Three measuring devices 6a to 6c are attached to the base 1 of the rock drilling equipment in a fixed position relative to the base. The measuring devices are connected to a control unit 7. Further, a separate measuring unit 8 is connected by way of example to the control unit 7. The measuring unit can operate in the same way as the fixed measuring devices 6a to 6c. Measuring devices 9a to 9c and 10a to 10c of the feed beam are further mounted in each feed beam 3a to 3c at certain positions in each feed beam. All the measuring devices 6a to 6c, 8, 9a to 9c and 10a to 10c can all be either transmitters, receivers or transmitter-receivers. However, either all the measuring devices 9a to 9c and 10a to 10c in the feed beam or, alternatively, the fixed measuring devices in the base 1 can be only transmitters and the others receivers, respectively. When using the separate measuring unit 8, it should most practically be preferably of the transmitter-receiver type.

The operation of the method according to the invention starts in that the base 1 of the rock drilling equipment is driven to the drilling site and its position in the general system of coordination relative to the rock is determined in some manner known per se, such as by using laser measuring or fixed point measuring or any automatic measuring method known per se. In this patent application and in the claims the definition position refers to the location of said object and similarly, the direction of the longitudinal axis associated with a certain object in the system of coordination in question. When the position of the base 1 relative to the general system of coordination of the rock has been determined, the position of each feed beam 3a to 3c can be determined in the general system of coordination by determining it first by means of the measuring devices 6a to 6c, 8, 9a to 9c and 10a to 10c relative to the base and by means of information indicating the position of the base converting this mathematically into the position of each feed beam in the general system of coordination. In practice, this occurs in the simplest way for example so that the measuring devices 9a to 9c and 10a to 10c of the feed beam in the feed beams 3a to 3c are transmitters that transmit a certain kind of oscilllation energy, that is, a measuring signal. The signals transmitted by the measuring devices of each feed beam 3a to 3c are measured separately and the control unit 7 calculates on the basis of their propagation time or the like the distances and directions of each measuring device in the base to a corresponding measuring device after which, on the basis of this information, the position of the feed beam can be calculated and thus also the position of the feed beam. This calculation can be performed for one feed beam at a time at suitable intervals, for example. In that case in continuous measuring, signals transmitted by the measuring devices 9a and 10a of the feed beam 3a are measured for a moment, then signals transmitted by the measuring devices 9b and 10b of the feed beam 3b are measured and further signals transmitted by the measuring devices 9c and 10c of the feed beam 3c and it thus continues in a specific order, whereby the positions of the feed beams are always known and the drilling or the direction of the booms and the feed beams can be controlled continuously. The FIGURE shows schematically by broken lines for the sake of illustration only some of the possible measuring directions between the different measuring devices.

If for some reason a measuring device of the feed beam should not be able to transmit reliably a signal relative to some measuring device of the base, one or more separate measuring units 8 can also be used which is placed in a suitable position under the booms on the ground, for example, and after that, by using the transmitter in the measuring unit 8, the position of the measuring unit 8 relative to the base is measured with the fixed measuring devices 6a to 6c of the base. After this, the receiver in the measuring unit 8 can be used for measuring the signals transmitted by the measuring devices 9a to 9c and 10a to 10c of the feed beams 3a to 3c because the position of the measuring unit is determined in the system of coordination of the base and thus through the base 1 in the general system of coordination of the rock. When desired, the fixed measuring devices 6a to 6c in the base 1 can naturally be replaced by transmitters and use receiverrs as measuring devices 9a to 9c and 10a to 10c in the feed beams. Further, all the measuring devices can also be transmitter-receiver detectors, whereby various verifying measurements between the feed beams relative to one another, for example, can possibly be accomplished in different ways. A plurality of separate measuring units 8 can be used if it is considered necessary due to the drilling conditions.

Different oscillation waves can be used as measuring signals, whereby e.g. ultra sound or radio frequency electromagnetic vibration is useful. Either a certain kind of a pure signal or various noise signals can be used as signals, whereby the measuring reliability and accuracy can be confirmed in different conditions in as suitable a way as possible.

The invention is above in the specification and in the drawing disclosed only by way of example and it is in no way intended to be restricted thereto. As a measuring device can be used two measuring devices attached to the base 1 and one other measuring device the position of which relative to the base 1 is known or can be measured. Further, the measuring devices can be attached directly to the rock drill or its base, such as to its drill carriage or when using percussion hammers, to a mounting connected to the end of the boom. When using only one measuring device determined for place relative to the rock drill, the directional angles of the rock drill relative to the rock can in a known system of coordination be measured by using e.g. gravity-based sensors indicating the angle of inclination and sensors measuring the side deflection angles of the boom the angle information of which being combined by calculating the position of the measuring device determines unambiguously both the position of the rock drill and the position of the tool connected to the rock drill relative to the rock in the determined system of coordination. Further, when using rock drilling equipments provided with a feed beam, the measuring devices can be attached, as mentioned in the specification, directly to the feed beam or, for example, to a separate cradle situated between the feed beam and the boom relative to which the feed beam can move in the longitudinal direction. In that case, as otherwise in arrangements provided with a feed beam, the position of the rock drill and the tool related thereto is measured with a movement sensor or the like so that the position of the drill in the longitudinal direction of the feed beam is known and similarly, the position of the drill rod or other tool in the cross direction of the feed beam is already predetermined and on the basis of this information the position of the tool can be determined relative to the feed beam. Correspondingly, the longitudinal movement of the feed beam relative to the cradle and its position in the cross direction of the axis of the tool and thus in the cross direction of the feed beam are previously known, whereby on the basis of this information, the position of the tool can be calculated relative to the cradle and further, that way the position of the tool thorough the measuring devices relative to the rock in a fixed system of coordination. The method can also be applied for following and predicting the movement of the rock drilling equipment so that the position of a certain measuring device is measured essentially continuously, whereby by means of successive points of location of a certain measuring device the movement of the measuring point and the direction of the movement or its changes relative to both velocity and acceleration can be calculated. Correspondingly, by using other information, such as information provided by a second measuring device connected to the same boom or sensors indicating the angle of inclination, the position and the movement of the tip of the tool of the rock drill, for example, can be determined all the time when moving it, whereby the information about the direction and position can be predicted, when desired, and slow down or otherwise control said movement in a manner appropriate for the result.

I claim:

1. A method for determining the position of a tool of a rock drill relative to rock in a system of coordination when using rock drilling equipment comprising a base, at least one drilling boom pivotally mounted at one end to the base and a rock drill connected pivotally relative to the boom at the other end of the boom and provided with a tool, in which method the position of the base of the rock drilling equipment in said system of coordination is determined and the position of the tool in said system of coordination is determined on the basis of the position of the base, the method comprising measuring the position of the tool relative to the base using at least three measuring devices situated at a known position relative to the base and at a distance from one another, wherein at least two of said measuring devices are attached to the base, and at least one additional measuring device is located at a known position relative to the tool of the rock drill, and wherein at least some of the measuring devices comprise a transmitter for transmitting oscillation energy and correspondingly, at least some of the measuring devices comprise a receiver for receiving oscillation energy; measuring the distance between the transmitters and receivers on the basis of the oscillation energy transmitted by each transmitter; calculating the distances between the receivers and transmitters on the basis of the measured distances; and determining the position of the tool relative to the base on the basis of the calculated distances.

2. A method according to claim 1, wherein said at least three measuring devices are attached to the base.

3. A method according to claim 1, including at least one additional separate measuring unit which comprises a transmitter and/or receiver and which is placed at a distance from the base of the rock drilling equipment; wherein the position of the separate measuring unit relative to the base is determined by measuring the distances between the measuring unit and other transmitters and/or receivers on the basis of the oscillation energy transmitted by the transmitters; and further wherein the separate measuring unit is used after determining its position along with the measuring devices attached to the base for measuring the position of the tool.

4. A method according to claim 1, wherein said at least two measuring devices are situated at a distance from one another and in a known position relative to the rock drill; and wherein the position of the rock drill is determined by measuring the position of both of said two measuring devices relative to the base, and by calculating the position of the tool of the rock drill relative to the base on the basis of the sites of said two measuring devices.

5. A method according to claim 4 in which method the position of a drill rod relative to the base is measured, the drill rod being used as the tool of the rock drill which is provided with a feed beam and moves along the feed beam wherein the position of the feed beam is determined relative to the base by said two measuring devices; and wherein the position of the drill rod is determined by taking into consideration its position in the cross direction of the feed beam and its longitudinal position in the longitudinal direction of the feed beam.

6. A method according to claim 1, wherein at least two rock drills are provided, and wherein two measuring devices are used for each rock drill, the position of said two measuring devices relative to the rock drill being known; and further wherein deflection angles of the tool of the rock drill relative to the rock in a known system of coordination are determined with gravity-based sensors indicating the angle of inclination.

7. A method according to claim 6 for determining the positions of the tools of the rock drills of rock drilling equipment comprise at least two booms, wherein said measuring devices in a known position relative to each rock drill comprise both a transmitter and a receiver; and wherein the mutual position of the rock drills is determined by measuring the distances between said measuring devices on the basis of oscillation energy.

8. A method according to claim 1, wherein, for measuring the distance, the propagation time of the oscillation energy is measured between the transmitter that transmitted said energy and a measuring device that is provided with a receiver and that received said oscillation energy.

* * * * *